United States Patent [19]
Zoller

[11] Patent Number: 5,362,349
[45] Date of Patent: Nov. 8, 1994

[54] PLASTIC HEAT SET MOLDING

[75] Inventor: Robert A. Zoller, Bay Village, Ohio

[73] Assignee: The Standard Products Company, Cleveland, Ohio

[21] Appl. No.: 909,695

[22] Filed: Jul. 7, 1992

[51] Int. Cl.⁵ .............................................. B29C 39/20
[52] U.S. Cl. ...................................... 156/242; 156/245; 156/308.2; 156/309.9; 156/322; 156/324.4; 264/259; 264/DIG. 60; 428/31
[58] Field of Search ............... 156/242, 245, 308.2, 156/309.9, 320, 322, 324.4; 264/248, 249, 259, 260, 271.1, DIG. 60; 428/31

[56] References Cited

U.S. PATENT DOCUMENTS

| | | |
|---|---|---|
| 2,834,052 | 5/1958 | Hunn ............... 264/DIG. 60 |
| 2,835,924 | 5/1958 | Schmeling ............ 264/259 |
| 3,216,068 | 11/1965 | Williams ............ 264/DIG. 60 |
| 3,616,099 | 10/1971 | Shanok et al. . |
| 3,705,935 | 12/1972 | Frances et al. ............ 264/259 |
| 3,837,984 | 9/1974 | Wagner et al. . |
| 4,101,698 | 7/1978 | Dunning et al. . |
| 4,260,655 | 4/1981 | Zoller . |
| 4,351,868 | 9/1982 | Otani . |
| 4,360,549 | 11/1982 | Ozawa et al. . |
| 4,369,608 | 1/1983 | Miura et al. . |
| 4,451,518 | 5/1984 | Miura et al. . |
| 4,498,697 | 2/1985 | McGlone et al. . |
| 4,515,744 | 5/1985 | Stamper et al. ............ 264/DIG. 60 |
| 4,563,141 | 1/1986 | Zoller . |
| 4,569,880 | 2/1986 | Nishiyama et al. . |
| 4,668,543 | 5/1987 | Schlenz . |
| 4,695,501 | 9/1987 | Robinson . |
| 4,868,021 | 9/1989 | Zoller . |
| 4,911,959 | 3/1990 | Miyakawa . |
| 4,979,888 | 12/1990 | Bauer et al. ............... 264/DIG. 60 |

Primary Examiner—Caleb Weston
Attorney, Agent, or Firm—Harness, Dickey & Pierce

[57] ABSTRACT

An apparatus and method of manufacturing a trim strip with an outer heat settable molding bonded to a base with an adhesive attaching member. The method includes heating and cooling a liquid heat settable material, reheating the material and bonding the outer molding to a base at very low pressures to form a trim strip.

8 Claims, 2 Drawing Sheets

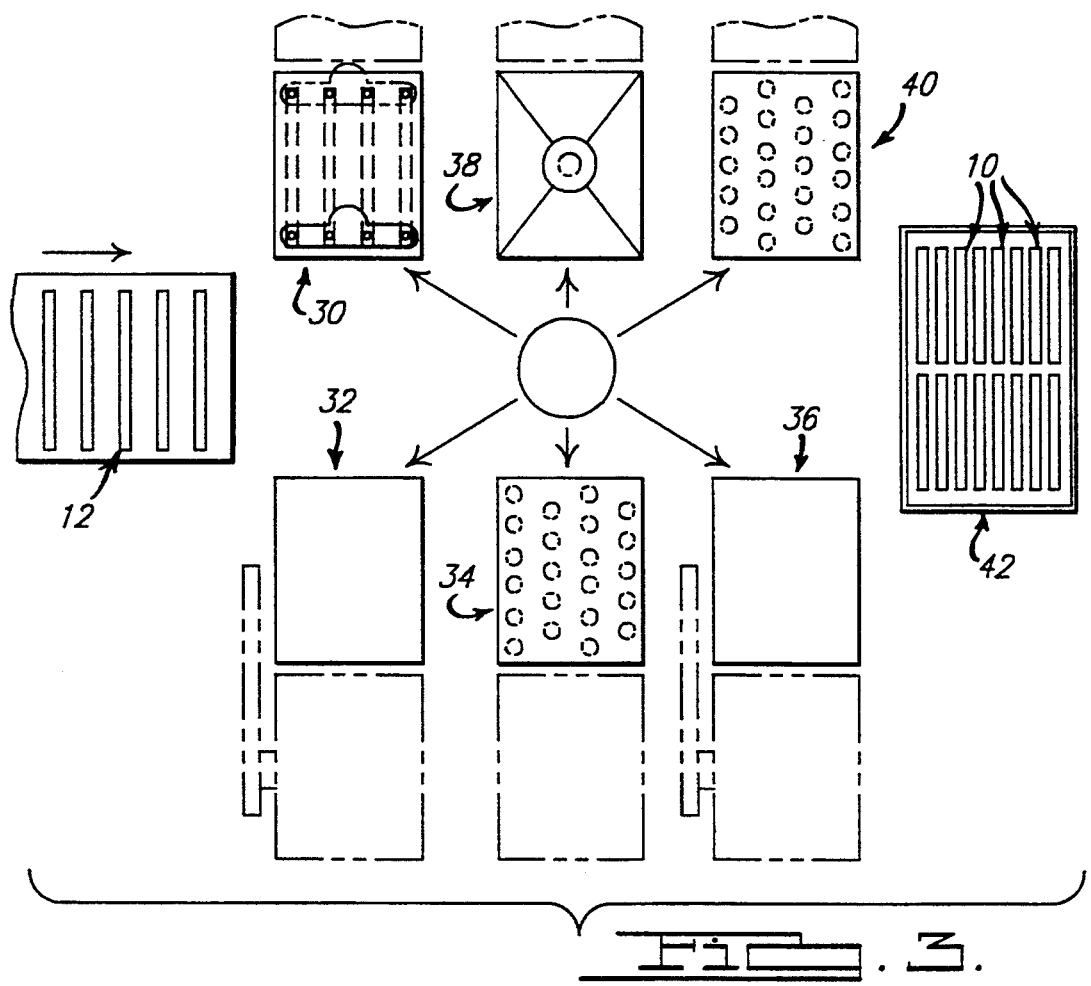
FIG. 3.
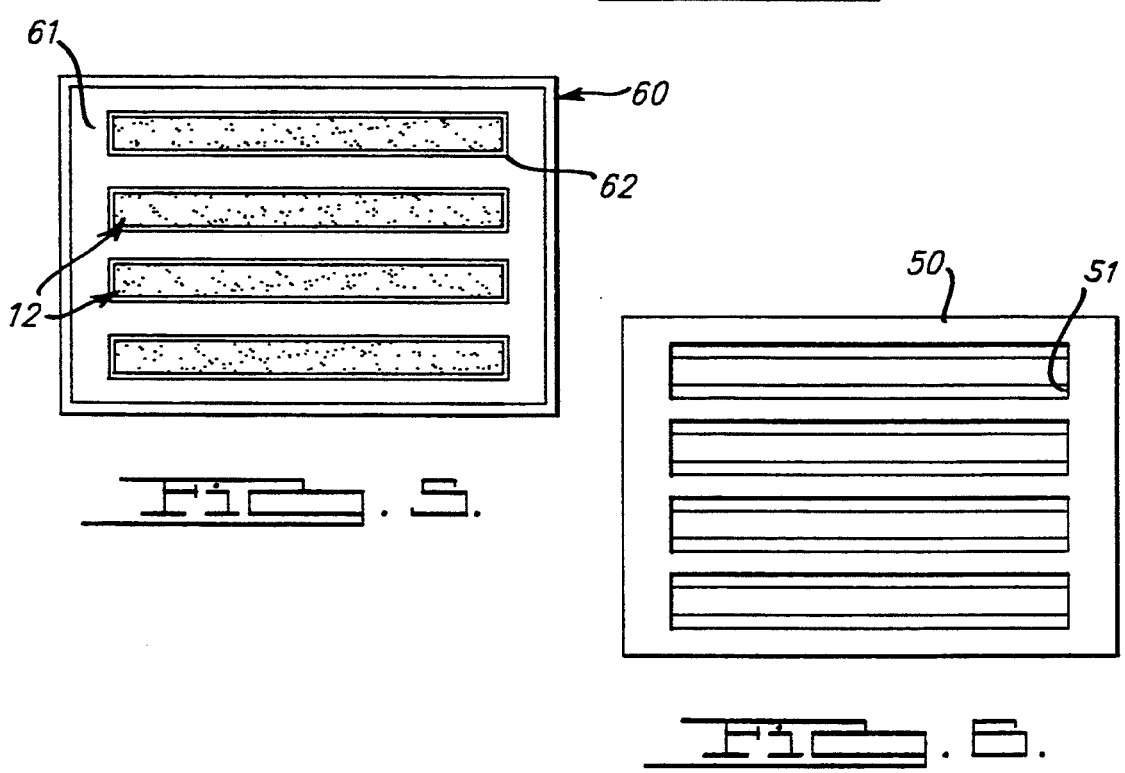
FIG. 5.
FIG. 6.

PLASTIC HEAT SET MOLDING

BACKGROUND OF THE INVENTION

The present invention relates to trim strips or molding and, more particularly, to a trim strip or molding manufactured from an injection process or extruding with a post form process.

In commonly known injection molding operations, generally the molds or dies utilized in the operation are very heavy, sturdy and durable. This is due to the fact that the material injected into the molds or dies is at elevated temperature and pressure. Thus, the molds must be very strong and durable to endure the increased temperature and pressure which also explains their high cost.

During the manufacturing of trim strips or molding, especially trim strips for vehicles, which utilize adhesive strips to position the trim strips onto the vehicle, a primer or barrier must be positioned between the outer plastic molding and the adhesive tape. The barrier is needed to prevent eventual migration of plasticizer from the molding to the adhesive tape which would, in time, destroy the bond of the adhesive tape to the molding. Thus, a very thin film of aluminum, rigid vinyl, or the like including chemical barrier coatings have been utilized to prevent migration of plasticizer to the adhesive tape.

Thus, it is desirous to have trim strips and a method of manufacturing trim strips which overcome the above disadvantages. Accordingly, the present invention provides the art with a trim strip which overcomes the above disadvantages.

The present invention provides the art with a trim strip which is manufactured by a molding process. The molding occurs at very low pressure, if any, to enable utilization of low cost lightweight molds or dies. The trim strip or molding is formed by dispensing liquid plastic into a mold and applying heat to solidify the plastic. The trim strip is cooled and reheated to heat the exposed surface of the strip. Adhesive tape or adhesive tape applied to a hard plastic strip to form a separate laminate is bonded to the plastic surface soon after completion of the second heating cycle. Additionally, a force may be applied to the backing member to enhance the bond between the two. Another advantage of the second heating step is that the molding flash is greatly reduced or completely eliminated. Also, the portion of the molded plastic outside of the attaching tape is generally more pointed and is better suited to form an effective tape skirt. (The tape skirt is that portion of the outer molding that partially blocks out the appearance of the attaching tape after assembly to the auto body.) The hard plastic strip or aluminum effectively acts as a barrier and prevents plasticizer from migrating from the solidified plastic which in time would destroy the bond between the adhesive tape and the solidified plastic. Plastics that can be used in this invention may be liquid vinyls such as plastisols. The hard plastic strip may be vinyl made in conventional extruding or calandering methods. The present invention, which is molded at very low pressure, produces trim strips which are color nondirectional and substantially eliminate metallic flop.

Also, on account of the low pressure, trim strips with large abrupt changes in thickness may be manufactured without "sinks" on the finished surface. This characteristic is becoming more important due to the trend of new designs requiring high gloss smooth surfaces on new automotive applications where sinks are more noticeable. It is also important for the new designs to incorporate weight saving features which can be achieved by hollowing out bottom portions of the trim strip.

This molding process also exhibits advantageous surface adherence capability when the molding is finally attached to a surface. A suitable tension force may be applied to the adhesive tape when the laminate is manufactured so that the completed molding is either straight or lengthwise curved so that the taped surface is lengthwise concaved.

From the subsequent detailed description taken in conjunction with the accompanying claims and subjoined drawings, other objects and advantages of the present invention will become apparent to those skilled in the art.

BRIEF DESCRIPTION OF THE DRAWINGS

FIG. 3 is a schematic view of a station layout for manufacturing trim strips of the present invention.

FIG. 5 is a plan view of FIG. 4 of the upper plate along line 5—5 thereof.

FIG. 6 is a plan view of a mold in accordance with the present invention taken along line 6—6 thereof.

DETAILED DESCRIPTION OF THE PREFERRED EMBODIMENT

Figure 1:
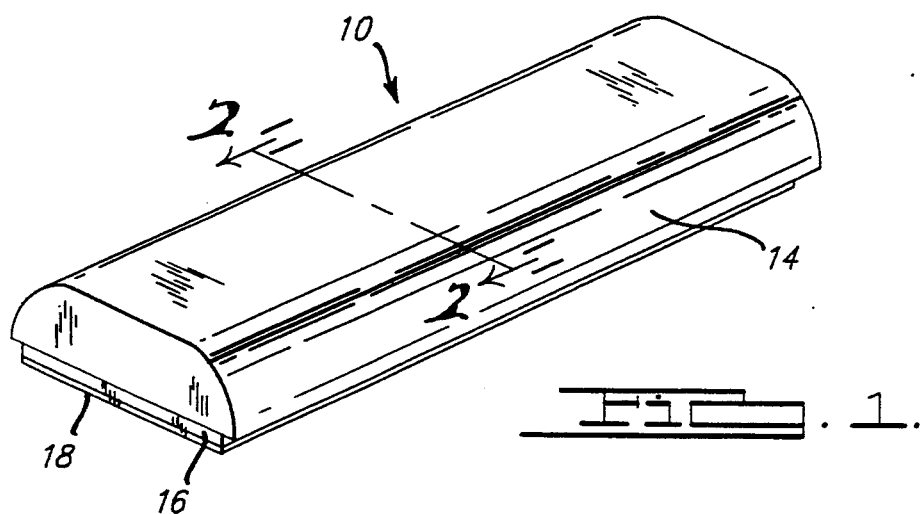
FIG. 1 is a perspective view of a trim strip in accordance with the present invention.
Figure 2:
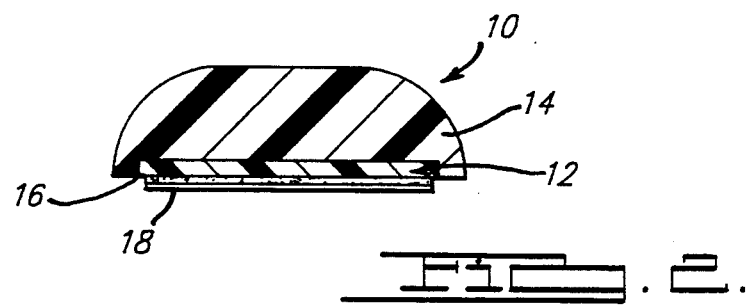
FIG. 2 is a sectional view of FIG. 1 through line 2—2 thereof.

Turning to the figures, particularly FIGS. 1 and 2, a trim strip is illustrated in accordance with the present invention. The trim strip 10 is an elongated member including a base 12, outer molding 14 and adhesive tape member 16.

The base 12 is generally an elongated flat planar strip. The strip may be extruded or provided from a roll of stock material. Generally the base 12 is a film of polyvinyl chloride material or aluminum. Preferably, the base 12 is relatively hard or stiff and provides rigidity to the trim strip 10.

The adhesive tape member 16 is generally of the two faced adhesive tape type. The tape may have substantially minimal thickness or it may be of the foam type. Generally a release layer 18 is on the outside of the adhesive member 16 which is removed upon positioning the trim strip 10 onto a surface.

The outer molding 14 is made from a liquid vinyl chloride resin elastomer material which is generally known as plastisol. Plastisol is available in a number of colors to enable the trim strip to be colored to a manufacturer's specifications. The outer molding may be directly bonded to the base 12 as shown in FIG. 2.

The present invention has features similar to that of U.S. patent applications Ser. No. 619,126, filed Nov. 28, 1990, entitled "Plastic Heat Set Molding"; Ser. No. 703,242, filed May 20, 1991, entitled "Trim Strip With One Piece Heat Set Plastic Cover Over Metal Core"; Ser. No. 750,885, filed Aug. 26, 1991, entitled "Plastic Heat Set Molding "; and Ser. No. 790,091, filed Nov. 15, 1991, entitled "Plastic Heat Set Molding," all to the same Applicant and all assigned to the same Assignee, the specifications and drawings of which. are expressly incorporated by reference.

Turning to FIGS. 3 through 6, a better understanding of the method of manufacturing the trim strip in accordance with the present invention will be understood.

The base member 12 may be purchased in a coil cut to a desired width and at a desired thickness. Likewise, the adhesive tape member 16, of a desired width, may be purchased in a coil. The base material 12 and adhesive tape member 16 are bonded together. Also, a liquid chemical primer may be applied to the hard base material 12 to enhance the bond strength to the molding 14.

Figure 4:
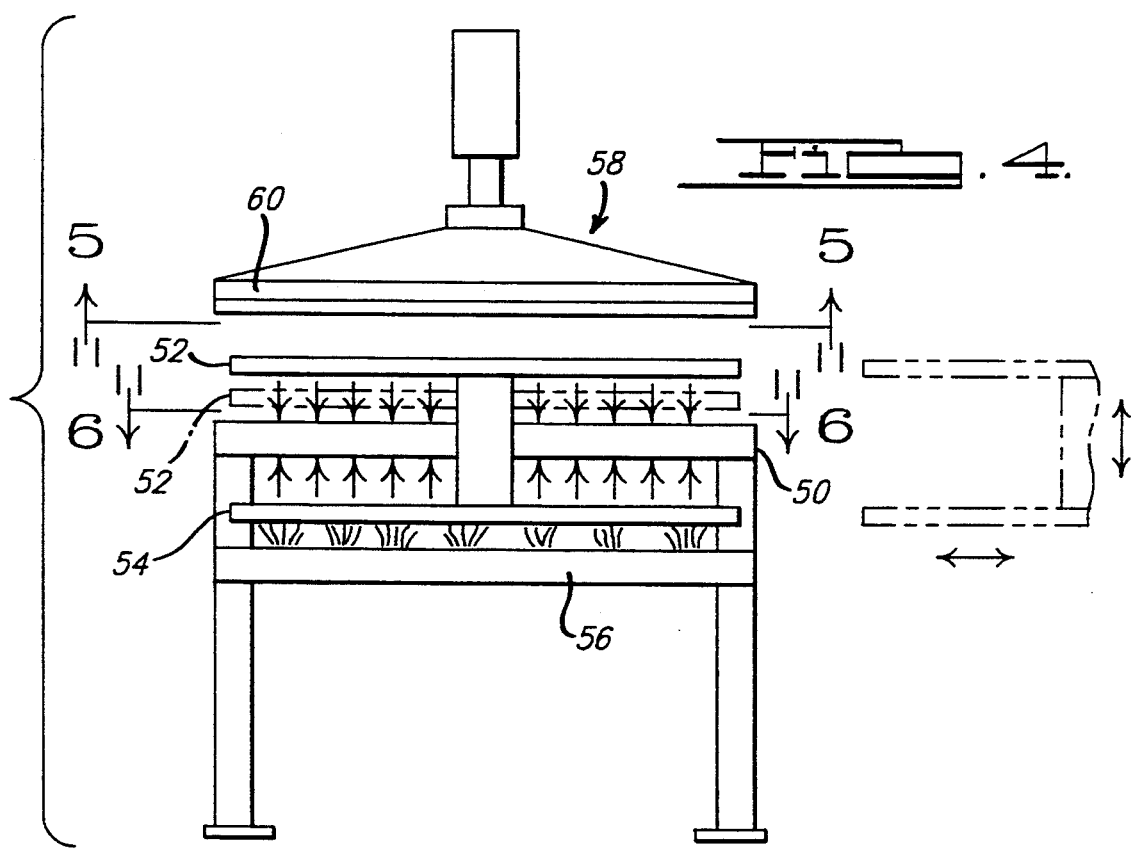
FIG. 4 is a schematic view of a molding apparatus for manufacturing trim strips in accordance with the present invention.

FIGS. 3 and 4 illustrate molding apparatus for manufacturing the trim strip 10. FIG. 3 shows a layout for mold stations 30, 32, 34, 36, 38 and 40 where an operator would receive a supply of backing members to position them in molds as will be explained with respect to FIG. 4. In FIG. 3, the mold station 30 is shown with a pouring apparatus, mold station 32 is shown in the first heating mode, mold station 34 is shown in the first cooling mode, mold station 36 is shown in the second heating mode, mold station 38 is shown in the covered force applying mode and mold station 40 is shown in an optional second cooling mode. Once the trim strips 10 are formed, the operator would place the finished trim strips into a receiving container 42.

The mold stations 30, 32, 34, 36, 38 and 40 which are substantially identical are best illustrated in FIG. 4. Each mold station includes a lightweight mold 50, movable heaters 52 and 54, cooling spray nozzle 56 and cover assembly 58. The mold 50 as best seen in FIG. 6 is stationarily positioned on the apparatus so that the mold 50 is substantially level with respect to horizontal. This enables the liquid plastisol to be poured into the mold 50 and seep its own level to be substantially level in the mold cavities 51. The mold 50 generally has four cavities, however, a number of different cavities could be provided.

Liquid plastisol is poured into the mold cavities and is heated to a temperature to form the plastisol to a solid elastomeric mass while the mold is open or uncovered. Generally, a temperature of approximately 170° Celsius will form the plastisol material into a solid mass. The heating process generally takes up to 4 minutes depending on molding size. As the heating occurs, the plastisol begins to solidify into a solid mass.

After the first heating cycle, the mold 50 is cooled via the water spray nozzles 56. The elastomeric mass becomes substantially solid and relatively hard or stiff upon cooling. Whereas when the strip is not cooled, the strip is comparably softer and increased force cannot be used to enhance bonding of the base and outer molding.

After the cooling cycle, the top heater 52 is moved closer to the exposed surface of the strips as shown in phantom in FIG. 4. The radiating heat from the heater 52 heats the surface of the strip. The strip is further heated for a period of approximately one minute which prevents heat from penetrating deeply into the strip. The heater 52 is withdrawn and the cover assembly 58 is lowered onto the mold 50. The cover assembly 58 which includes cover plate 60, holds a corresponding number of backing member therein. As best illustrated in FIG. 5, the plate 60 includes a resilient heat resistant layer 61, preferably silicone rubber, having a series of holding pockets 62 to receive the backing members. The pockets 62 may include a vacuum assist to hold the backing members into the pockets 62. The plate 60 is aligned with the mold 50 such that the backing members are positioned to mate with the cavities to form the trim strip 10. At the end of the second heating cycle, the plate 60 is lowered onto the mold 50 such that the base member 12 contacts the heated solid plastisol surface within the mold cavities. At this time, since the molded plastic is quite solid, increased force is applied by the cover 58 to increase the bond strength between the base member 12 and the outer layer 14. This contacting enables the backing members 12 to bond to the outer molding 14 forming an integral trim strip 10. Also, the base 12 prevents migration of the plasticizer to maintain the adhesive tape 16 intact as explained above. After the backing members have been in contact with the outer molding 14 for a desired period of time, the water spray nozzles 56 are reactivated to cool the mold 50. Upon cooling, the trim strips 10 are formed and removed from the mold 50. Since the heating and cooling steps take place at substantially zero pressure, the trim strips do not encounter the sink problem. Likewise, the molds may be movable and the heaters and water cooling unit stationary. Thus, depending upon the design of the apparatus, a majority of the components may be movable to accomplish the manufacturing of the trim strip.

While the above detailed description describes the preferred embodiment of the present invention, it will be understood that the present invention is susceptible to modifications, variations, and alterations without deviating from the scope and spirit of the subjoined claims.

What is claimed is:

1. A method of manufacturing a trim strip comprising:
   providing a mold;
   adding a desired amount of a heat settable material into said mold;
   heating said mold containing said desired amount of heat settable material;
   cooling said mold containing said heat settable material;
   heating an exposed surface of said heat settable material in said mold;
   bonding a backing member to said exposed surface of said heat settable material;
   forming a trim strip from said heat settable material and backing member; and
   removing said trim strip from said mold.

2. The method according to claim 1 further providing force on said backing member to enhance bonding to said surface.

3. The method according to claim 1 further comprising radiantly heating said exposed surface.

4. The method according to claim 3 further comprising positioning a heater in close proximity of said surface so as to only heat said surface.

5. The method according to claim 1 wherein said backing member includes a hard or stiff layer and an adhesive layer on one side of said hard or stiff layer.

6. The method according to claim 1 further comprising said backing member being an attachment member for securing said strip to a surface.

7. The method according to claim 1 wherein said heat settable material is plastisol.

8. The method according to claim 5 further comprising applying a chemical barrier to said hard or stiff layer to enhance bonding with said heat settable material.

* * * * *